US012561416B1

(12) United States Patent
Perillo et al.

(10) Patent No.: US 12,561,416 B1
(45) Date of Patent: Feb. 24, 2026

(54) AUTOMATED USER-IDENTIFICATION SYSTEMS

(71) Applicant: Amazon Technologies, Inc., Seattle, WA (US)

(72) Inventors: Evan Perillo, Woodinville, WA (US); Maxwell Wei Xuan, Washington, DC (US); Baomin Wang, Seattle, WA (US); Brendan Pratt, Bethel, CT (US); Yufei Jia, Seattle, WA (US); Abhinav Kashyap, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 352 days.

(21) Appl. No.: 18/064,161

(22) Filed: Dec. 9, 2022

(51) Int. Cl.
| | |
|---|---|
| *H04L 29/06* | (2006.01) |
| *G01T 1/29* | (2006.01) |
| *G02B 7/09* | (2021.01) |
| *G02B 27/28* | (2006.01) |
| *G06F 21/32* | (2013.01) |
| *G06T 7/70* | (2017.01) |
| *G06V 10/141* | (2022.01) |

(Continued)

(52) U.S. Cl.
CPC ............ *G06F 21/32* (2013.01); *G01T 1/2978* (2013.01); *G02B 7/09* (2013.01); *G02B 27/283* (2013.01); *G06T 7/70* (2017.01); *G06V 10/141* (2022.01); *G06V 10/44* (2022.01); *H04N 23/21* (2023.01); *G02B 21/361* (2013.01)

(58) Field of Classification Search
CPC ......... G06F 21/32; G01T 1/2978; G02B 7/09; G02B 27/283; G02B 21/361; G02B 2027/0138; G02B 27/0977; G02B 21/0052; G02B 21/244; G02B 6/2817; G02B 6/352; G02B 6/3512; G02B 17/0856; G06T 7/70; G06T 2207/10048; G06V 10/141; G06V 10/44; H04N 23/21; H04N 1/00204; H04N 2201/02433; B60R 2300/70; B60R 21/01538; B60R 2300/30; B41K 1/06; B41L 7/00; F21V 23/0478; G05B 2219/31308; G05B 2219/36175; G05B 2219/37426; G01N 21/00; G01N 2203/0641; G01N 2021/1765; G01M 11/005; H01J 1/53; H01J 2229/8907; H01J 2237/221; H10K 50/856; G03H 2001/221

See application file for complete search history.

(56) References Cited

U.S. PATENT DOCUMENTS

| | | | |
|---|---|---|---|
| 6,292,285 B1 * | 9/2001 | Wang ................... | G02B 26/123 |
| | | | 347/243 |
| 9,117,106 B2 | 8/2015 | Dedeoglu et al. | |

(Continued)

*Primary Examiner* — Joseph P Hirl
*Assistant Examiner* — Leynna Truvan

(57) ABSTRACT

This disclosure describes a user-recognition system configured to target a location of a palm of a user at a wide variety of distances without the need to illuminate and/or capture an entire field of view (FOV) at all times. The user-recognition system comprising a first sensor for capturing an image of the palm, a first mirror disposed with the first sensor, a projector disposed with the first mirror, and a second mirror disposed with the first mirror. The second mirror being displaceable and configured to reflect light, projected from the projector and reflected from the first mirror, in a direction toward the palm, and reflect received light, reflected from the palm to the first mirror and to the first sensor.

20 Claims, 10 Drawing Sheets

(51) Int. Cl.
    *G06V 10/44*         (2022.01)
    *H04N 23/21*      (2023.01)
    *G02B 21/36*      (2006.01)

(56)              References Cited

U.S. PATENT DOCUMENTS

| | | |
|---|---|---|
| 9,235,928 B2 | 1/2016 | Medioni et al. |
| 9,473,747 B2 | 10/2016 | Kobres et al. |
| 2013/0284806 A1 | 10/2013 | Margalit |
| 2020/0008899 A1* | 1/2020 | Tripathi ................ H04N 13/15 |
| 2021/0173480 A1* | 6/2021 | Osterhout ........... G06F 3/04815 |
| 2023/0065504 A1* | 3/2023 | Wagner ............. G01N 15/1433 |
| 2023/0120611 A1* | 4/2023 | Polchin ............... H04N 13/239 |
| | | 348/47 |

* cited by examiner

AUTOMATED USER-IDENTIFICATION SYSTEMS

BACKGROUND

The use of computing devices continues to proliferate. As usage proliferates, so too does the manner in which these computing devices identify and/or authenticate users. For instance, users often authenticate with a computing device by typing in a username/password combination, providing biometric data (e.g., fingerprint scan, etc.), answering one or more questions known the user, or the like. In some instances, easing the user-identification and authentication process enhances the experience of the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
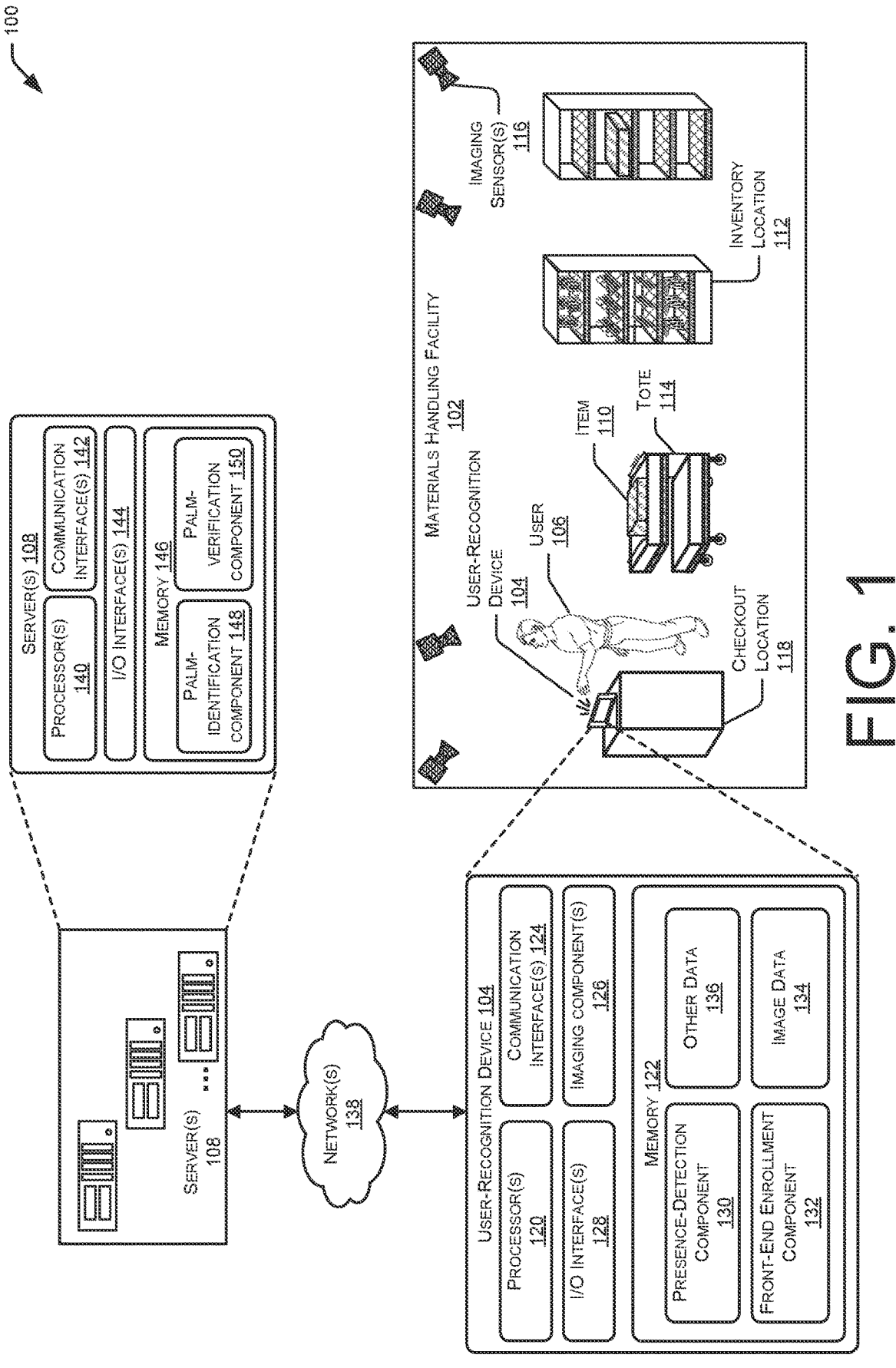
FIG. 1 illustrates an example environment that includes a user-recognition device configured to generate image data of a palm of a user for purposes of identifying the user. After generating the image data, the user-recognition device sends the image data to one or more servers, which include a palm-identification component to identify the user by matching the image data to previously captured image data of a palm of the user. In addition, the servers may include a palm-verification component to verify the match between the image data and the previously captured image data.

This disclosure describes systems and techniques for identifying users using biometric-recognition techniques. As described below, users may enroll with a user-recognition system that utilizes various biometric-based recognition techniques so users may be identified without having to carry or use traditional forms of identification, such as showing an ID card or accessing their personal phone. The user-recognition system may recognize, or identify, enrolled users for various purposes, such as for automating traditional checkout experiences in a materials handling facility (or "facility") by charging appropriate user accounts with purchases of items selected by enrolled users in the facility. The user-recognition system may also perform one or more verification methods for ensuring that a proper identification has been made.

In one illustrative example, the systems and techniques are used to recognize or identify users within a materials handling facility, which may include, or have access to, an inventory-management system. The inventory-management system may be configured to maintain information about items, users, condition of the facility, and so forth. For example, the inventory-management system may maintain data indicative of a result of different events that occur within the facility, such as what items a particular user picks or returns, a location of the particular user, and so forth.

Operation of the inventory-management system may be supported by sensor data acquired by one or more sensors. The sensor data may include image data acquired by imaging devices such as cameras, information acquired from radio frequency tags, weight sensors, and so forth. For example, the inventory-management system may automatically identify an item removed from an inventory location as well as a user that removed the item. In response, the inventory-management system may automatically update a virtual shopping cart of the user.

Traditionally, when a user has finished their shopping session, the user would have to pay for their items by having a cashier scan their items, or by using dedicated self-checkout stands. The techniques described herein reduce friction in the traditional checkout experience by recognizing or identifying a user enrolled for use of the user-recognition system and charging a user account for that user with the cost of the items included in their virtual shopping cart. According to the techniques described herein, a user enrolled with the user-recognition system may need only provide biometric information by, for example, scanning a palm of the user at an imaging device, scanning a fingerprint of the user, looking at a camera of a user-recognition device located in the facility, or the like in order to be identified by the user-recognition system.

To utilize the user-recognition system, a user may request to be enrolled by interacting with a user-recognition device positioned in a facility. For example, the user may select an enroll option on a display of the user-recognition device, issue a voice or GUI-based command requesting to be enrolled, insert a user ID card into the user-recognition device, and/or simply present their hand or palm before the user-recognition device to prompt the enrollment process.

Upon requesting to be enrolled in the user-recognition system, the user-recognition device may, with permission and/or upon explicit request by the user, begin collecting various types of biometric data, and/or other data, for the user. For example, the user-recognition device may include one or more imaging sensors (e.g., a camera) that begins capturing image data (e.g., an individual image, a sequence of images, a video, etc.) of at least a portion of the user, such as a palm of the user, a face of the user, or the like. In the example of the palm, the user-recognition device may request that the user move their hand to different angles and/or orientations as the device captures the image data and may also capture image data under different lighting conditions (e.g., no flash, flash, different light polarizations, etc.), to generate image data representing the palm of the user under different environmental conditions.

In some examples, the user may already have an account registered with the inventory-management system to pay for items selected during a shopping session. In such examples, the user-recognition device may determine a user account with which the user is registered in various ways, such as by requesting that the user insert a personal ID card (e.g., driver's license), scan a barcode that may be presented on a display of a phone of the user, login with his or her login credentials, and so forth.

Once the user-recognition device has obtained the image data representing the palm or other portion of the user, the user-recognition device may utilize this data to enroll the user with the user-recognition system. In some examples, the user-recognition system may be implemented entirely on the user-recognition device, which may include the software, firmware, and/or hardware components to implement the techniques described herein. However, in some examples, the user-recognition system may be implemented according to a split architecture where the user-recognition device performs client-side enrollment and identification techniques, and more intensive and/or advanced processing may be performed using a backend, server-based implementation. For example, the user-recognition system may include one or more network-based computing devices positioned at a separate location in the facility, and/or at a remote, cloud-based location. The network-based devices may include various components for implementing the user-recognition system.

In such examples, the user-recognition device may send the image data, and/or feature data generated by the user recognition device using the image data, to the network-based devices to enroll the user for the user-recognition system. The network-based devices of the user-recognition system may perform various processing techniques on the image data and/or feature data such that the user-recognition system is able to identify the user from subsequently received image data and/or feature data.

The user-recognition system may analyze the image data to determine various features of the user. For example, the user-recognition system may extract and/or generate, based on the image data, palm-feature data representing the palm of the user. This palm-feature data may represent information that is potentially unique to the palm of the user, such as the pattern of creases in the user's palm, the pattern of veins of the user's palm, the geometry of one or more portions of the user's hand (e.g., finger sizes/shape, palm size/shape, etc.), and/or the like. The user-recognition system may utilize any type of processing techniques to generate the palm-feature data and may represent the palm of the user depicted in the image data using various types of data structures, such as feature vectors. In some examples, the user-recognition system may include one or more trained models (e.g., machine-learning models) that have been trained to receive image data of a user as input, and output feature vectors representing a palm of the user. Generally, the trained model(s) may comprise any type of models, such as machine-learning models (e.g., artificial neural networks, convolution neural networks (CNNs), classifiers, random-forest models, etc.) that may be trained to identify a palm of a user and/or one or more other portions of the user (e.g., face, etc.).

Upon obtaining the feature data that represents the palm of the user, the user-recognition system may store the feature data in an enrollment database and associate the feature data with a user profile for that specific user. In this way, when subsequent image data is received for a user at a user-recognition device, the feature data stored in the enrollment database may be compared with the feature data generated from the subsequent image data to identify a user profile for the user represented in the subsequent image data and audio data.

In this way, the user may be enrolled for use of the user-recognition system such that, after completing subsequent shopping sessions, the user may checkout by placing his or her palm over an imaging component of a user-recognition device to allow the user-recognition system to automatically recognize the user. The user-recognition device may detect the presence of the user (e.g., detect the palm, detect a face, detect the speech utterance, detect a touch input via a touch display, etc.), and begin streaming image data and audio data to the backend devices of the user-recognition system. The backend devices of the user-recognition system may then utilize the trained model(s) to extract feature data and compare that feature data to stored feature data for user profiles of enrolled users. In addition, or in the alternative, the user may scan his or her palm for recognition upon entering the facility and, in some instances, may simply exit the facility with his or her picked items and without again scanning his or her palm. In these instances, the user may be identified upon entry and located by the system as the user moves about the facility, such that the user may "just walk out" without further interaction with associates or devices at the facility.

In some instances, the user-recognition device may operate at a range of working distances to enable recognition of users at a wide range of heights. In some instances, the user-recognition device may include one or more sensors and projectors disposed with one or more mirrors for enabling recognition of a palm of a user positioned within a wide range of heights. For instance, the user-recognition device may include a sensor disposed with a first mirror for capturing an image of a palm of a user. A projector may be disposed with the first mirror for projecting light toward the palm of the user. A second mirror may be disposed with the first mirror. The second mirror being displaceable and configured to direct light projected from the projector toward the palm of the user and direct light reflected from the palm of the user toward the sensor to capture an image of the palm of the user at a wide range of heights.

In some instances, the user-recognition device may include one or more cameras, such as a red-green-blue (RGB) camera, an infrared (IR) camera, and/or the like. In some instances, the RGB camera may be used to determine when a palm (or other body part) of a user is underneath the user-recognition device for initiating one or more components of the user-recognition device for performing an identification and/or authentication process, as described below. In other instances, the user-recognition device may include a depth sensor (e.g., a time-of-flight (ToF) sensor) or other type of sensor (e.g., motion sensor, IR sensor, etc.) for determining when a palm of a user is underneath and/or within the FOV of the device. In addition, or in the alternative, the RGB camera, the depth sensor, or the other type of sensor may function to determine whether the user palm is within a "Z" range of the device within the which the user-recognition device is capable of generating accurate image data for recognizing the user. That is, as discussed below, the user-recognition device may have a working range of distances in which the device accurately generates image data to recognize a user. The RGB camera or depth sensor may thus be used to sense a depth of the user palm to determine if the user palm is within an VOF of the device.

In addition to the above, the user-recognition device may include an IR projector to project IR light and an IR camera configured to generate image data indicative of the IR light.

In some instances, the IR projector and/or the IR camera may initiate some or all of their operations in response to the RGB camera, depth sensor, or other sensor detecting a palm of a user or other user body part within an FOV of the device. For instance, the IR projector and/or the IR camera may be awakened in response to the RGB camera and/or depth sensor detecting something in its path (e.g., within the FOV of the camera(s) or projector(s)).

In addition to the above, the user-recognition device may include a displaceable mirror (e.g., a scan mirror, a voice-coil mirror, a galvo mirror pair, etc.). The displaceable mirror being configured to reflect IR light, projected from the IR projector in a direction toward a palm or other object based at least in part in response to the RGB camera, depth sensor, or other sensor detecting the palm or other object within an FOV of the device. The displaceable mirror may be further configured to be displaceable to reflect IR light, reflected from another mirror (e.g., a pick-off mirror, a polarizing beam splitter (PBS), a knife edge mirror, etc.), in a direction toward a palm or other object based at least in part in response to the RGB camera, depth sensor, or other sensor detecting the palm of the user or other object within an FOV of the device. The displaceable mirror may be further configured to be displaceable to reflect IR light reflected from the palm or other object in a direction toward the IR camera based at least in part in response to the RGB camera, depth sensor, or other sensor detecting the palm of the user or other user body part within an FOV of the device. The displaceable mirror may be further configured to be displaceable to reflect IR light reflected from the palm or other object in a direction toward another mirror (e.g., a pick-off mirror, a polarizing beam splitter (PBS), a knife edge mirror, etc.), such that the other mirror reflects the IR light in a direction toward the IR camera based at least in part in response to the RGB camera, depth sensor, or other sensor detecting the palm of the user or other object within an FOV of the device.

The IR projector may project IR light, which may strike the user palm when the user palm is within the FOV of the device. The IR camera may then generate image data of the user palm as the IR light strikes the palm. The user-recognition device may then send this image data generated by the IR camera (and, potentially, the image data generated by the RGB camera and/or other camera(s)) to the network-based devices for enrolling the user in the user-recognition system or to identify an already enrolled user.

Thus, the user-recognition device may detect a palm of a user within an FOV of the device, cause a displaceable mirror to be displaced such that projected IR light is reflected in a direction toward the palm, and reflect the IR light reflected from the palm in a direction toward an IR camera. Thereafter, image data of the palm may be generated. The device may then either send the image data (or feature data generated therefore) to a network-based device for enrolling and/or identifying, and/or may perform an enrollment and/or identification process locally. The user-recognition device thus provides a process for a user to place their palm within a range of heights that is likely to generate high-quality image data of their palm, which leads to a high-accuracy user-recognition system.

Further, it is noted that the user-recognition devices described herein may take any type of form factor. For instance, a user-recognition device may sit atop a table, affix to a horizontal or vertical surface, comprise a mobile, handheld scanner, or the like. In these instances, the user-recognition device may include a trigger or other component for actuation by a user to cause the RGB camera to locate a user palm within an FOV of the device, to cause the IR projector to project the IR light, and to cause the IR camera to generate image data.

Although the techniques described herein are primarily with reference to identifying users for the purpose of identifying a user account to charge for items selected from a materials handling facility, the techniques are equally applicable to any industry in which user recognition may be helpful. For instance, the user-recognition system may be implemented for quick service restaurant applications such as for the purpose of identifying a user account to charge for items selected at a drive-up window of a quick service restaurant. In another example, the user-recognition system may be implemented for security purposes such as accessing locked locations, accessing user accounts via computing devices, accessing bank accounts, and so forth. Further, while certain types of machine-learning models and algorithms are discussed herein, the techniques may be employed using other types of technologies and are generally scalable to different computer-based implementations. Further, while the techniques are described with reference to identifying users via feature data generated from user palms, it is to be appreciated that the techniques may apply to any other type of biometric data that may uniquely identify users.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations. For instance, the described techniques for utilizing biometric data for identifying users upon their explicit request may be utilized in an array of environments for an array of purposes. For instance, these techniques may be utilized for identifying users upon entry to an environment (e.g., upon entry to a secure area of an environment), identifying users requesting to utilize equipment or other physical apparatuses, identifying users at kiosks or other locations, and/or any other type of environment where users may request to be identified and/or authenticated.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 that includes a materials handling facility 102 that includes a user-recognition device 104 configured to generate image data of a palm of a user for purposes of identifying the user. After generating the image data, the user-recognition device sends the image data to one or more servers, which include a palm-identification component to identify the user by matching the image data to previously captured image data of a palm of the user. In addition, the servers may include a palm-verification component to verify the match between the image data and the previously captured image data.

In some instances, some or all of the user-recognition system resides remotely from the materials handling facility 102, while in other instances some or all of the user-recognition system resides within or proximate to the materials handling facility 102. As FIG. 1 depicts, the user 106 may have engaged in, or be about to engage in, a shopping session in the materials handling facility 102. For instance, the user 106 may have selected an item 110 from an inventory location 112 (e.g., shelf, aisle, etc.) and placed the item 110 in a tote 114 (e.g., shopping cart). The inventory location 112 may house one or more different types of items 110 and the user 106 may pick (i.e., take) one of these items 110.

As illustrated, the materials handling facility 102 (or "facility") may include one or more sensors, such as the illustrated imaging sensors 116, and/or an array of other sensors located on or near the inventory location(s) 112. In this example, the imaging sensors 116 are configured to capture video data within the facility 102 for use in determining results associated with events, such as the picking of the item 110 by the user 106. While FIG. 1 illustrates various example sensors, the sensors in the facility 102 may comprise any other type of sensor, such as weight sensors (e.g., load cells), microphones, and/or the like, as described in detail below. In some instances, the facility 102 may be monitored and/or otherwise associated with an inventory-management system configured to determine events in the facility 102 associated with the user 106, such as taking items 110 that the user 106 would like to purchase. The inventory-management system may track the items 110 selected by the user 106 and maintain a virtual shopping cart which includes all of the items 110 taken by the user 106. Thus, when a user 106 would like to leave the facility 102 with the items 110 they have taken, the inventory-management system may charge a user account associated with the user 106 for the cost of the items 110 that were taken.

As shown in FIG. 1, the user 106 may approach a checkout location 118 associated with the user-recognition device 104. The user 106 may determine that they would like to enroll for use of a user-recognition system in order to checkout of the facility 102 and pay for their item(s) 110. Alternatively, or additionally, the user may interact with the user-recognition device 104 upon entering or exiting the facility 102. In either instance, the user 106 may determine that they would like the user-recognition system to securely generate data that is usable to identify the user 106. This data may be utilized by the user-recognition system such that, once enrolled, the user 106 need only scan his or her palm to be identified by the user-recognition system in order to charge their user account with the purchase of their item(s) 110 and/or to otherwise later recognize an account or identifier of the user 106 at the explicit request of the user 106.

As illustrated, the user-recognition device 104 may comprise one or more processors 120 configured to power components of the user-recognition device 104 and may further include memory 122 which stores components that are at least partially executable by the processors 120, as well as other data. For example, the memory 122 may include a presence-detection component 130 to detect the presence of a user 106 and a front-end enrollment component 132 configured to perform various operations for enrolling the user 106 for use of the user-recognition system.

In some instances, the front-end enrollment component 132 may receive a request to enroll the user 106 for use of the user-recognition system. The request may comprise various types of input, such as a selection made via an I/O interface 128 (e.g., touch screen, mouse, keyboard, etc.) of a user interface element presented on a display for starting an enrollment process. Additionally, the front-end enrollment component 132 may detect a speech utterance from the user 106 indicating a request to enroll (e.g., "please enroll me," "I would like to check out," etc.). Another request example may include the user 106 sliding a user ID card into an I/O interface 128, such as a credit card, driver's license, etc. However, any type of input may be detected as a request by the front-end enrollment component 132.

In some examples, the presence-detection component 130 may be executable by the processors 120 to detect a trigger indicating presence of the user 106. The trigger detected by the presence-detection component 130 may comprise one or more types of input. For instance, the presence-detection component 130 may include logic to detect, using one or more imaging components 126, a palm of the user 106 over or proximate to the user-recognition device 104. Other examples of triggers detected by the presence-detection component 130 that may indicate the presence of the user 106 may include receiving touch input (or other input, such as a mouse click) via one or more I/O interfaces 128 of the user-recognition device 104. However, any type of input may be detected as a trigger by the presence-detection component 130. In some examples, the trigger detection may not be performed, or may be included in or the same as receiving the request to enroll.

After receiving the request to enroll from the user 106, the front-end enrollment component 132 may, begin generating image data 134 using one or more imaging component(s) 126 (e.g., cameras). For instance, the front-end enrollment component 132 may utilize the imaging component(s) 126 to obtain image data 134 such as an image or picture, a sequence of consecutive images, and/or video data. The image data 134 may represent the palm of the user 106 and may be used to identify creases in the palm, veins in the palm, geometric information regarding the palm and other parts of the hand or the user 106 and/or the like. Once the front-end enrollment component 132 has obtained the image data 134 representing the palm or other portion of the user 106, the user-recognition device 104 may send (e.g., upload, stream, etc.) the image data 134 to the servers 108 over one or more networks 138 using one or more communication interfaces 124.

The network(s) 138 may include private networks such as an institutional or personal intranet, public networks such as the Internet, or a combination thereof. The network(s) 138 may utilize wired technologies (e.g., wires, fiber optic cable, and so forth), wireless technologies (e.g., radio frequency, infrared, acoustic, optical, and so forth), or other connection technologies. The network(s) 138 is representative of any type of communication network, including one or more of data networks or voice networks. The network(s) 138 may be implemented using wired infrastructure (e.g., copper cable, fiber optic cable, and so forth), a wireless infrastructure (e.g., cellular, microwave, satellite, etc.), or other connection technologies.

The communication interface(s) 124 may include devices configured to couple to personal area networks (PANs), wired and wireless local area networks (LANs), wired and wireless wide area networks (WANs), and so forth. For example, the communication interfaces 124 may include devices compatible with Ethernet, Wi-Fi™, and so forth. In some examples, the communication interface(s) 124 may encode the image data 134 and/or other data 136 generated by the user-recognition device 104 prior to sending over the network(s) 138 according to the type of protocol or standard being used.

Upon receiving the image data, one or more components of the back-end servers 108 may generate feature data using the image data. This feature data may be in a vector form and may represent characteristics about the user's palm that may be used to differentiate the palm from other user palms. It is to be appreciated that while this process describes the servers 108 generating the feature data, in other instances the user-recognition device 104 may be configured to generate the feature data and may send the feature data, in addition to or rather than the image data 134, to the servers. Moreover, it is to be appreciated that while this process describes the servers 108 generating the feature data, in other instances one or more servers located on location (e.g., located at the materials handling facility 102, located at a quick service restaurant (shown in FIGS. 4A-B, etc.)) may generate feature.

After generating or receiving the feature data, one or more components of the servers 108 store the feature data in an enrollment database in association with a user profile of the user 106. That is, this palm-feature data is stored such that it may be compared to feature data generate from subsequent image data for later identification of the user 106 at the facility 102 or other facilities that are associated with the user-recognition system. In some instances, this feature data, or signature data, is associated with visually salient and discriminative interest points of the palm of the user 106, as described in detail below.

As illustrated, the server 108 may comprise one or more processors 140, one or more communication interfaces 142, one or more input/output interfaces 144, and memory 146, which may store a palm-identification component 148 and a palm-verification component 150. It is to be appreciated that the components 148 and 150 are described separately in some examples herein, in some instances the functionality of each component may be integrated, such as in examples where the functionality of the palm-verification component 150 is used in an identification process along with some or all of the techniques of the palm-identification component 148.

Sometime after the user has enrolled with the user-recognition system, the imaging components 126 may receive additional image data of the palm of the user 106, such as at a time when the user 106 has returned to the facility 102 at a later date. In another example, after the user has enrolled with the user-recognition system, the imaging components 126 may receive additional image data of the palm of the user 106, such as at a time when the user 106 visits a quick service restaurant. After the servers 108 receive the additional image data from the user-recognition device 104, the servers may generate additional feature data based on the additional image data. At this point, one or more components of the servers 108 may compare the additional feature data to feature data stored in respective user profiles for the purpose of identifying the user associated with the additional image data.

For example, the palm-identification component 148 of the user-recognition system may compare the additional feature data generated from the new image data with the feature data generated and stored in association with the user profile of the user 106 and, thus, determines that the additional image data corresponds to the user 106. To do so, the palm-identification component may compare the new feature data to feature data associated with each of multiple image data associated with respective user accounts, including the account of the user 106. In addition, the palm-verification component 150 may perform one or more of the verification processes between the newly generated image data and the image data previously stored in association with the account of the user 106 to verify that these two images do indeed match.

In some instances, in addition to identifying the user 106, the user-recognition system may then store the additional feature data in the enrollment database in association with the user profile of the user 106. Therefore, this additional feature data, potentially along with the initial feature data, may be used for later identification of the user 106. Furthermore, as introduced above and discussed in further detail below, in some instances the user-recognition may remove or otherwise lessen the impact of older feature data over time such that more recent feature data associated with the user 106 is used more heavily (or exclusively) to identify the user 106.

Figure 2:
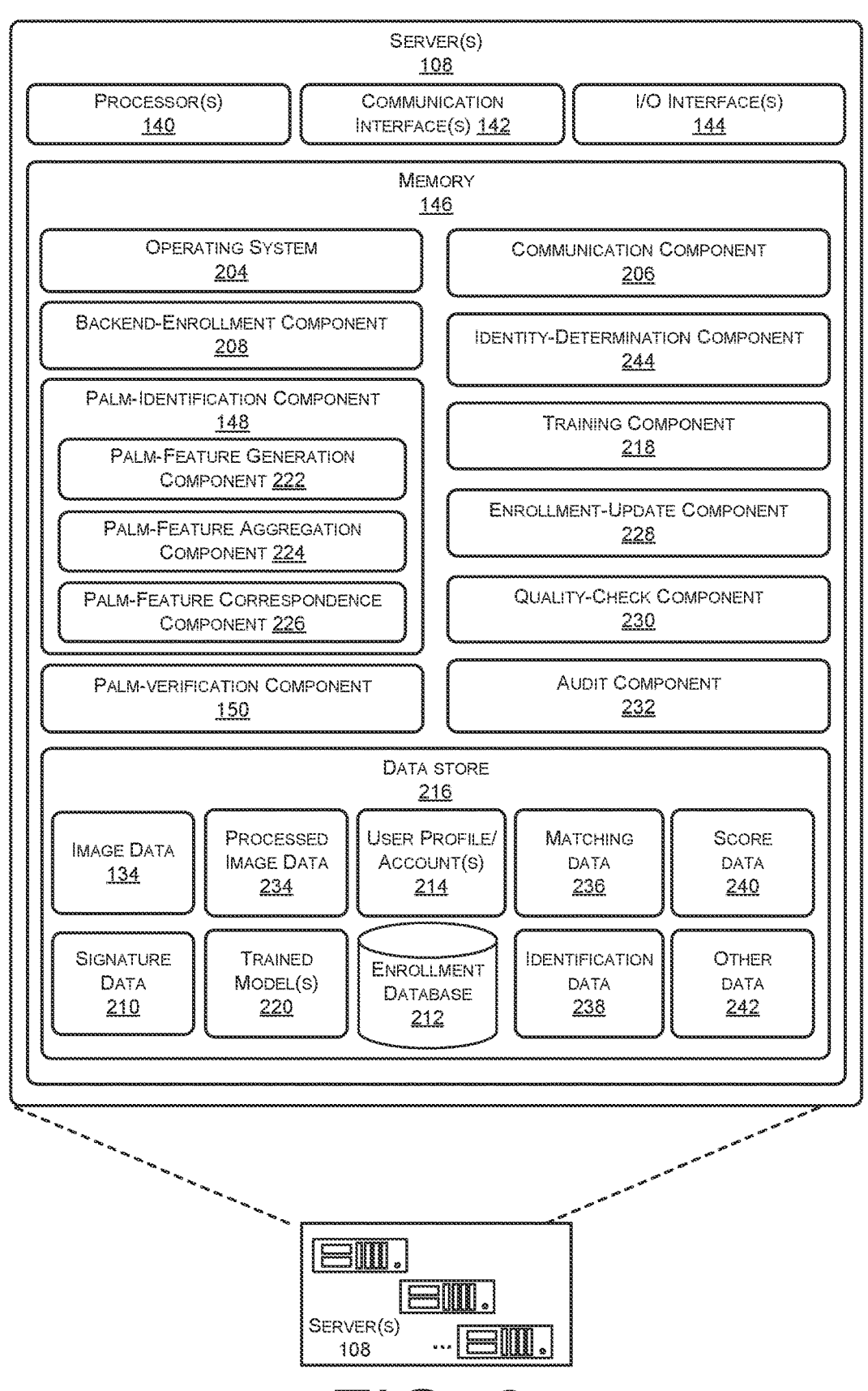
FIG. 2 illustrates example components of one or more servers configured to support at least a portion of the functionality of a user-recognition system, including the palm-identification component and the palm-verification component.

FIG. 2 illustrates example components of one or more servers 108 configured to support at least a portion of the functionality of a user-recognition system. In some examples, the user-recognition system described herein may be supported entirely, or at least partially, by the user-recognition device 104 in conjunction with the servers 108. The server(s) 108 may be physically present at the facility 102, may be at a remote location accessible by the network 138, or a combination of both. The server(s) 108 do not require end-user knowledge of the physical location and configuration of the system that delivers the services. Common expressions associated with the server(s) 108 may include "on-demand computing," "software as a service (SaaS)," "cloud services," "data centers," and so forth. Services provided by the server(s) 108 may be distributed across one or more physical or virtual devices.

The server(s) 108 may include the one or more hardware processors 140 (processors) configured to execute one or more stored instructions. The processors 140 may comprise one or more cores. The server(s) 108 may also include one or more input/output (I/O) interface(s) 144 to allow the processors 140 or other portions of the server(s) 108 to communicate with other devices. The I/O interfaces 144 may comprise Inter-Integrated Circuit (I2C), Serial Peripheral Interface bus (SPI), Universal Serial Bus (USB) as promulgated by the USB Implementers Forum, RS-232, and so forth.

The server(s) 108 may also include the one or more communication interfaces 142. The communication interfaces 142 are configured to provide communications between the server(s) 108 and other devices, such as the user-recognition device 104, the interface devices, routers, and so forth. The communication interfaces 142 may include devices configured to couple to personal area networks (PANs), wired and wireless local area networks (LANs), wired and wireless wide area networks (WANs), and so forth. For example, the communication interfaces 142 may include devices compatible with Ethernet, Wi-Fi™, and so forth.

The server(s) 108 may also include one or more busses or other internal communications hardware or software that allow for the transfer of data between the various modules and components of the server(s) 108.

As shown in FIG. 2, the server(s) 108 includes one or more memories 146. The memory 146 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 146 provides storage of computer-readable instructions, data structures, program modules, and other data for the operation of the server(s) 108. A few example functional modules are shown stored in the memory 146, although the same functionality may alternatively be implemented in hardware, firmware, or as a system on a chip (SOC).

The memory 146 may include at least one operating system (OS) 204. The OS 204 is configured to manage hardware resource devices such as the I/O interfaces 144, I/O devices, the communication interfaces 142, and provide various services to applications or modules executing on the processors 140. The OS 204 may implement a variant of the FreeBSD™ operating system as promulgated by the Free-BSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 146. These modules may be executed as foreground applications, background tasks, daemons, and so forth.

A communication component 206 may be configured to establish communications with one or more of the imaging sensors 116, the user-recognition devices 104, other server(s) 108, or other devices. The communications may be authenticated, encrypted, and so forth.

A backend-enrollment component 208 may be configured to perform various operations for enrolling a user 106 for use of the user-recognition system. For instance, the backend-enrollment component 208 may perform various operations, and/or cause other components to perform various operations, to enroll users 106 in the user-recognition system. In some instance, the backend-enrollment component 208 may at least partly control a palm-identification component 148 that performs operations for analyzing image data 134 depicting a palm or other portion of the user 106. In some examples, the backend-enrollment component 208 may cause the palm-identification component 148 to analyze the image data 134 and extract features which represent a palm of the user 106, which may be stored as signature data 210. The illustrated signature data 210 may comprise palm-feature data (e.g., salient and discriminative palm features and/or visually-imperceptible palm features), a confidence level associated with the respective feature data, coordinates of the each respective feature in the respective image data, and/or the like. As described herein, the signature data 210 may include palm-feature data and/or additional data.

After obtaining, determining, and/or generating the signature data 210, the backend-enrollment component 208 may enroll the user 106 in an enrollment database 212 which indicates that the user 106 is enrolled for use of the user-recognition system. In some examples, the backend-enrollment component 208 may associate, or map, the various data to a user profile/account 214 that is associated with the user 106. For example, the backend-enrollment component 208 may map, for each enrolled user 106, respective signature data 210 to corresponding user profiles 214 in the enrollment database 12. Thus, the enrollment database 212 may store indications of user profiles 214, as well as the data for users 106 associated with each of the user profiles 214. When a user 106 is enrolled for use of the user-recognition system, the backend-enrollment component 208 may map, or store an association, between signature data 210 of the user 106 with the user profile 214 for that user 106. Further, the user profile 214 may include various information for the user 106, such as payment information to perform transactions for items 110 selected by the user 106 from the facility 102.

The various types of data discussed herein may be stored in a data store 216 in the memory 146 of the server(s) 108, as illustrated in FIG. 2.

Further, the backend-enrollment component 208 may cause a training component 218 to train one or more trained models 220. The training component 218 may utilize training data to train the trained model(s) 220 to perform various operations for extracting and/or generating, from the image data 134, signature data 210. The trained model(s) 220 may comprise any type of model, such as machine-learning models, including but not limited to artificial neural networks, classifiers, decision trees, support vector machines, Bayesian networks, and so forth.

As a specific example, the trained model(s) 220 may include or comprise one or more convolution neural networks (CNNs), recursive neural networks, and/or any other artificial networks, that are trained to analyze image data 134 received as input, and extract, determine, identify, generate, etc., signature data 210 representing a palm of the user 106. As a specific example, the signature data 210 may comprise a 128-dimension feature vector representing the palm of the user 106. In examples where the trained model(s) 220 include one or more CNNs, various functions may be utilized to transform the image data 134 into a metric space, such as a triplet loss function. Thus, the training component 218 may train the CNNs of the trained model(s) 220 using various functions, such as a triplet loss function, to extract, identity, or otherwise determine signature data 210 from input image data 134. Once in the metric space, extracted feature data may be compared, or matched, by computing a distance between the extracted feature data and feature data stored in the enrollment database 212. For instance, when feature data is extracted from the image data 134 into signature data 210 by the trained model(s) 220, the extracted signature data 210 may then be compared to stored data in the enrollment database 212 to identify a user profile for the user 106 represented in the input image data 134. For instance, the extracted signature data 210 may comprise a vector that is compared with stored vectors in the enrollment database 212 to identify which stored vectors have the smallest "distance" between the extracted feature data. The smaller the distance, the closer the strength of correspondence between the extracted feature data and the stored feature data representing users 106 that are enrolled for use of the user-recognition system. In some examples, other calculations may be performed, such as finding a cosine of an angle between two vectors, depending on the network utilized by the trained model(s) 220. However, any type of models may be utilized for the trained model(s) 220.

For instance, in some examples, the trained models 220 may additionally comprise model(s) trained to identify visually salient and discriminative feature of user palms or other portions of users. For instance, in addition to the types of models described immediately above, which the palm-identification component 148 may be use to identify one or more candidate matching images, the trained models 220 may include one or more models configured to identify visually salient points in the user palms, for use by the palm-identification component 150. For example, the models 220 may be configured to identify points in a palm of a user that are visually identifiable by human users, such as a point along a crease or line, an edge point where a color differentiation exists, or the like.

These latter models, configured to identify visually salient points, may be trained in some instances using manually labeled training data that labels visually salient points in the training data. In addition, or in the alternative, these models may be trained using synthetic shapes having edges, corners, and/or the like marked as interest points. That is, the data used to train the models may comprise three-dimensional shapes having sharp contrasts at edges and corners of the shapes, which may be used to train the models to identify points of sharp contrast in user palms, such as points along lines or creases of the user palms.

The palm-identification component 148 may include various sub-components for performing various operations. For instance, the palm-identification component 148 may include a palm-feature generation component 222 to extract or otherwise generate feature data from the image data 134. The palm-feature generation component 222 may utilize the trained model(s) 220, and/or include algorithms, to perform any type of feature extraction method, or embedding, to analyze the image data 134 and extract palm-feature data, which may be stored as part of the signature data 210. For instance, the palm-feature generation component 222 may utilize state-of-the-art models, such as clustering, artificial neural networks, scale-invariant feature transform, edge detection, or any other type of extraction or embedding technology, to extract palm-feature data from the image data 134.

The palm-identification component 148 may further include a palm-feature aggregation component 224 configured to aggregate feature data for a user 106. For instance, the palm-feature aggregation component 224 may combine the palm-feature data that has been extracted from a group of images depicting the user 106, such as by averaging the features in the feature data.

Once a user 106 is enrolled for use of the user-recognition system, an identity-determination component 244 may be utilized to determine and/or verify an identity of a user 106 that interacted with a user-recognition device 104. For example, the server(s) 108 may receive image data 134 from a user-recognition device 104 and the identity-determination component 244 may be configured to determine an identity of the user 106, where the enrollment database 212 indicates the identity of the user 106 by, for example, indicating the user profile 214 that is associated with that user's identity.

The identity-determination component 244 may cause a palm-feature correspondence component 226 to perform various operations for determining or identifying a user 106 whose palm is depicted in the received image data 134. For example, the palm-feature correspondence component 226 may compare the palm-feature data for the received image data 134 with palm-feature data stored in the enrollment database 212 for different user profiles 214 of users 106 enrolled in the user-recognition system in order to determine user profiles 214 for one or more users 106 whose respective palm-feature data correspond to the extracted palm-feature data. In some instances, the score calculated by the palm-feature correspondence component 226 may be compared to a threshold and, if the score is greater than the threshold, may result in identification of the user. If multiple user profiles are associated with scores that are greater than the threshold, then the user profile associated with the highest may be deemed to be associated with the image data 134 and/or further analysis may be performed to identify the appropriate user. Further, in some instances, the user-recognition system may employ set-reduction techniques to identify, based on an initial comparison, a top "N" group of user profiles 222 of users 106 whose respective palm-feature data most strongly correspond to the extracted palm-feature data. In some examples, a single user identity/profile 214 may be determined as corresponding to the input palm-feature data. However, in some examples a group of top "N" candidates may be identified by the trained model(s) 220 as corresponding with a threshold amount of strength (e.g., 50% correspondence, 75% correspondence, etc.) to the extracted palm-feature data. A second level of deeper analysis may then be performed to identify a single user from the "N" candidates.

Figure 3:
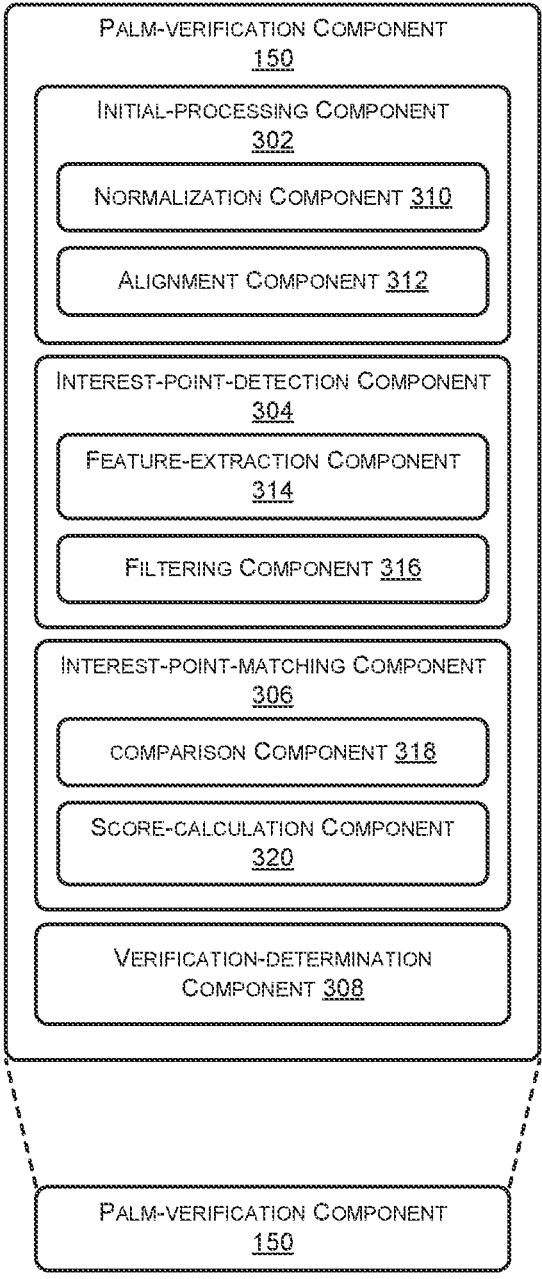
FIG. 3 illustrates example components of the palm-verification component of FIGS. 1 and 2.

For example, and as introduced above, in some instances the memory 146 may further store the palm-verification component 150. The palm-verification component 150 may function to verify whether received image data does indeed match (correspond to) the previously stored image data that the palm-identification component 148 determined as a match. In other instances, the palm-verification component 150 may determine which of the top "N" candidates most closely matches the received image data and, thus, in these instances the palm-verification component 150 may form a part of the identification process, rather than (or in addition to) the verification process. FIG. 3 describes example components of the palm-verification component 150.

At a high level, the palm-verification component 150 (or other illustrated components) may initially align and normalize received image data before comparing the received image data, or feature data generated therefrom, to other image data. For instance, the palm-verification component 150 may align the received image data to a predefined alignment such that the received image data will be compared to stored image data in an aligned manner. Further, the palm-verification component 150 may normalize the image data by, for instance, identifying a darkest pixel value and setting its value as zero (0), identifying a lightest pixel value and settings its value as two-hundred-fifty-five (255), and interpolating pixel values of the image data therebetween. After processing the received image data 134 in this and/or other manners, the palm-verification component 150 may store generated processed image data 234.

In addition, the palm-verification component 150 may then compare signature data of this now processed image data 234 to signature data of the image data determined to match the received image data (or to the top "N" candidates, in some instances). The matching portions of the image data may be stored as matching data 236. In some instances, the palm-verification component 150 determines, for a first interest point within the processed image data, whether the coordinates of this first interest point are within a threshold spatial distance of any interest points in the candidate image data. If so, the palm-verification component 150 may identify which interest point in the candidate image data is associated with coordinates that are closest to the coordinates of the first interest point (if there are multiple interest points in the candidate image data that are within the threshold spatial distance) and may determine the similarity of these two points. For instance, the palm-verification component 150 may calculate a Euclidian distance between the feature vector associated with the first interest point and the feature vector associated with the interest point in the candidate image data. This Euclidian distance may be stored as the matching data 236 and/or as score data 240 indicating a level of similarity between these two points. The palm-verification component 150 may continue to determine, for each interest point within the processed image data 234, whether the coordinates of this respective point are within a threshold spatial distance of one or more interest points in the candidate image data and, if so, may determine a Euclidian distance between the feature vector of this interest point and the closest interest point in the candidate image data. Again, this distance may be stored as matching data 236 and/or score data 240 representing how similar these points are two one another.

As illustrated, the enrollment database 212 may further store identification data 238 and other data 242. The identification data 238 may represent data indicating which candidate image data, and/or corresponding user account, has been determined to correspond to received image data. For instance, the palm-identification component 148 and/or the palm-verification component 150 may store an indication of the image data that matches received image data and/or an indication of which user account received image data corresponds to and/or is to be associated with. In some instances, the palm-verification component 150 determines score data 240 representing a similarity between received image data (e.g., processed image data 234) and candidate image data based on the one or more Euclidian distances between interest points of these image data. For instance, the similarity score between received image data and the candidate image data may comprise a logarithm of a sum of each determined Euclidian distance. Thus, the score data for this particular match may increase with each respective matching interest point. This score data 240 may be compared to a threshold and, if the score is greater than the threshold (or otherwise satisfies one or more criteria), the image data may be determined and/or verified to match the candidate image data and, thus, the palm-verification component 150 or another component may store an indication of this match as the identification data 238.

Further, the memory 146 may store an enrollment-update component 228 configured to update the palm-feature data and/or other signature data 210 stored in association with user profiles to allow for removal of stale feature data and use of more recent feature data. As introduced above, as a user provides image data of the user's palm over time, the enrollment-update component 228 may use feature data from this new image data to generate and store additional feature data associated with the user. Further, the enrollment-update component 228 may remove or lessen a weight associated with older feature data.

In addition, the memory 146 may store an audit component 232 configured to perform one or more auditing processes in response to occurrence of one or more predefined events. For example, the audit component 232 may perform a nightly auditing processes comprising rich comparison of palm-feature data associated with respective user profiles to one another to identify any errors previously made by the system. After identifying an error, the system may correct the error and may also this information to further train the trained model(s) 220 utilizing techniques similar to those performed by the backend-enrollment component 208.

Additionally, the memory 146 may store a quality-check component 230 which determines an overall metric of the quality of the extracted palm-feature data. For instance, the quality-check component 230 may determine that additional image data 134 needs to be obtained for a user 106 for various reasons, such as a bandage or glove covering the palm of the user 106, or the like. In some examples, the quality-check component 230 may utilize a trained model(s) 220 to determine whether a feature vector is of sufficient quality and, if not, may cause the user-recognition device to request additional image data 134.

FIG. 3 illustrates example components of the palm-verification component 150 of FIGS. 1 and 2. As illustrated, the palm-verification component 150 may include an initial-processing component 302, an interest-point-detection component 304, an interest-point-matching component 306, and a verification-determination component 308. The initial-processing component 302 may include a normalization component 310 that may be configured to normalize pixel values of received image data. For instance, and as noted above, the normalization component 310 may be configured to normalize each pixel value between zero (0) and two-hundred-fifty-five (255) based on a darkest pixel being normalized to zero and a lightest pixel being normalized to two-hundred-fifty-five. The initial-processing component 310 may further include an alignment component 312, which may be configured to change an orientation of the received image data so as to align with a predefined alignment. Further, the portion of the image data corresponding to the palm may be extracted from the image data during this alignment and normalization process. It is to be appreciated, meanwhile, that the current image data may have previously been aligned and/or normalized as part of the recognition process and prior to the verification process.

The interest-point-detection component 304 may include a feature-extraction component 314 and a filtering component 316. The feature-extraction component 314 may input the now processed image data 234 into one or more of the trained models 220. As described above, the trained model may be configured to identify visually salient and discriminative interest points in the processed image data 234. The trained model of the feature-extraction component 314 may output the signature data, which may comprise respective coordinates of each interest point, a feature vector representing pixel value(s) at and/or around the respective interest point, and a confidence level associated with each respective interest point. In some instances, each interest point (or region of interest) is indicated by coordinates determined by a particular pixel, while the feature vector represents pixel values of this central pixel and one or more neighboring pixels. Thus, each feature vector may represent pixel value(s) of a single pixel, a group of nine pixels (3×3), a group of forty-nine pixels (7×7), and so forth. The filtering component 316, meanwhile, may be configured to remove, from the list of interest points in the output signature data, those interest points that are associated with respective confidence levels that are less than a predefined threshold confidence value. In some instances, those interest points with confidence values less than the threshold may not be removed from the signature data, but might instead not be used for comparing to interest point(s) in candidate image data.

The interest-point matching component 306, meanwhile, includes a comparison component 318 and a score-calculation component 320. The comparison component 318 may be configured to compare one or more interest points of processed image data to respective interest points of candidate image data. For instance, the comparison component 318 may determine, for a first interest point in the processed image data 234, whether one or more interest points exist in signature data of the candidate image data that is within a spatial-distance threshold of the first interest point. If so, the comparison component 318 may determine a similarity between the first interest point and the closet interest point in the candidate image data (e.g., the interest point having coordinates that are closest to coordinates of the first interest point). For instance, the comparison component 318 may determine a feature-vector distance (e.g., a Euclidian distance) between the feature vector of the first interest point of the feature vector of the interest point in the candidate image data. Score data indicating this distance may then be scored, which may be used for by the score-calculation component 320 for calculating an overall similarity between the image data and the candidate image data. As described above the score-calculation component 320 may generate score data indicating a similarity between the image data and the candidate image data as, for instance, a logarithm of a sum of inverse feature-vector distances of the matching interest points. Of course, while example techniques are described for determining how closely interest points match, and for calculating a score indicating whether image data match one another, other comparison and calculation techniques may be used. For example, in some instances the spatial-distance and feature-vector-distance may be used simultaneously when comparing interest points.

The verification-determination component 308, meanwhile, may determine whether processed image data corresponds to candidate image data by comparing the determined score to a threshold. If the score is greater than the threshold, then verification-determination component 308 may determine that the image data match one another. In instances where the palm-verification component 150 compares received and processed image data 234 to multiple candidate image data, the verification-determination component 308 may select the candidate image data having a highest score (that is greater than a threshold in some instances) as the matching image data.

Figure 4A:
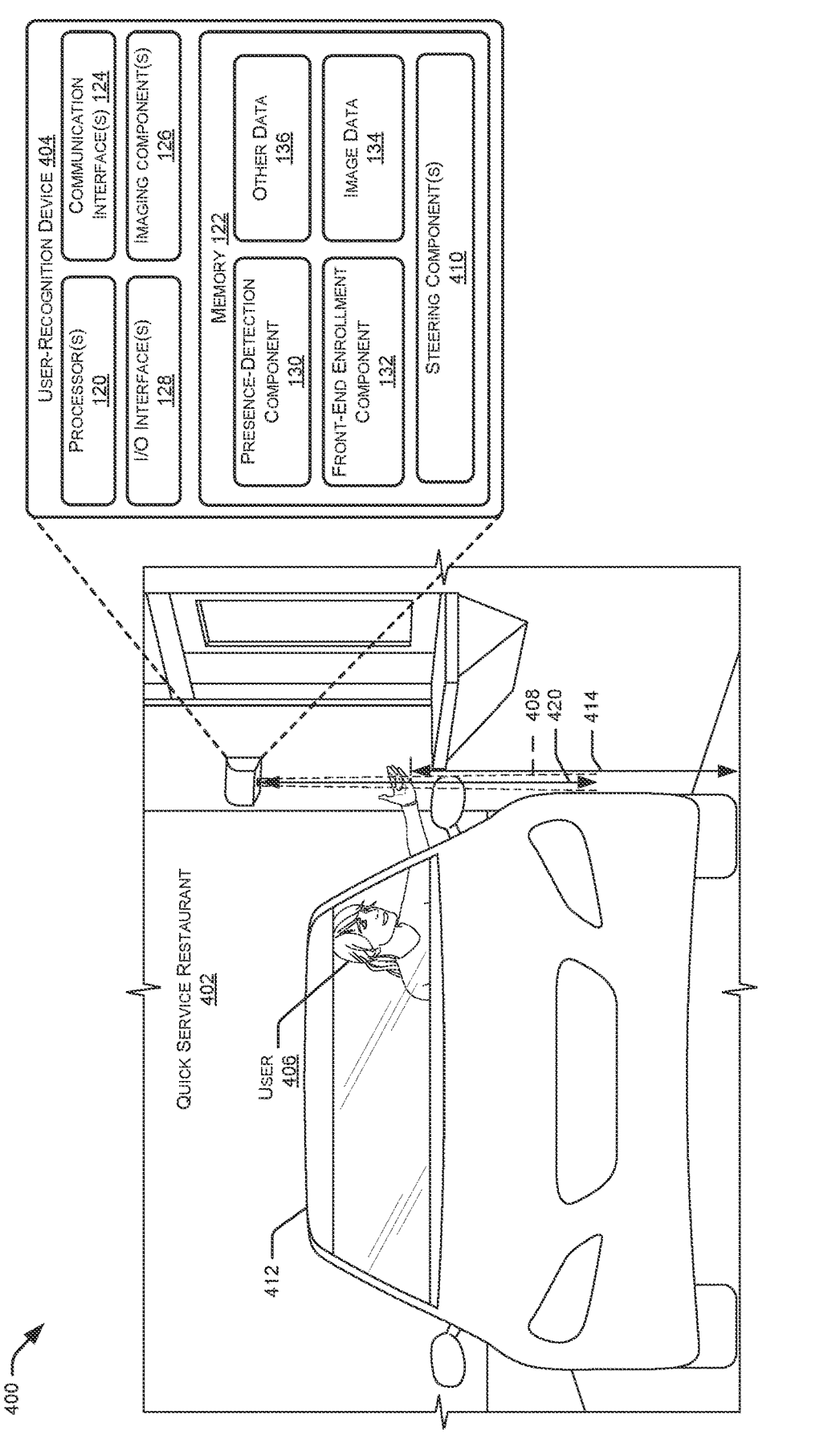
FIGS. 4A-B collectively illustrate an example environment that includes a quick service restaurant that includes another embodiment of a user-recognition device configured to generate image data of a palm of a user for purposes of identifying the user.
Figure 4B:
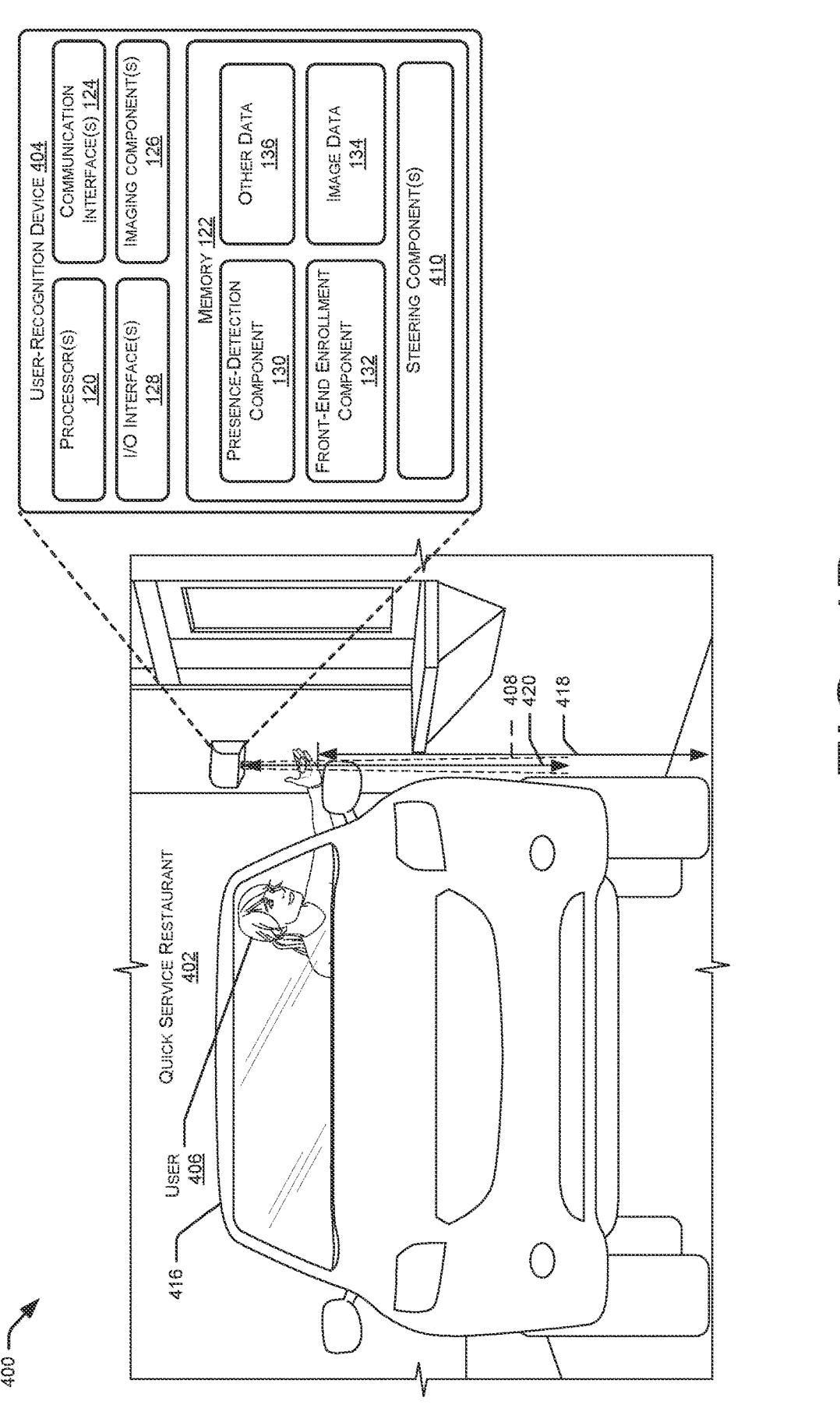

FIGS. 4A-B collectively illustrate an example environment 400 that includes a quick service restaurant 402 that includes another embodiment of a user-recognition device 404 configured to generate image data of a palm of a user 406 for purposes of identifying the user 406. The user-recognition device 404 being configured to specifically target a location of a palm of the user 406 without the need to illuminate and/or capture an entire scan FOV 408 at all times.

Inasmuch as FIGS. 4A-B depict the identifying of the user 406, while referring to the same elements and features of the user-recognition device 404, the following discussion of specific features may refer interchangeably to any of FIGS. 1-3 except where explicitly indicated. In particular, FIGS. 4A-B illustrate an embodiment of the user-recognition device 404, including the one or more processor 120, memory 122, communication interfaces 124, imaging components 126, I/O interfaces 128, presence-detection component 130, front-end enrollment component 132, image data 134, and other data 136. The user-recognition device 404 may include a steering component 410. The steering component 410 may be stored in the memory 122. The steering component 410 may be configured to receive data associated with a location of the palm of the user 406 from the presence-detection component 130, for example.

As illustrated, this user-recognition device 404 may have a form factor that is attached to or integrated to an exterior wall or other structure. In addition to being configured to specifically target a location of a palm of the user 406 without the need to illuminate and/or capture an entire FOV at all times, the design of the user-recognition device 404 may allow these devices to operate more robustly in outdoor locations. That is, because the components are generally aimed downwards, these components are generally protected from rain, hail, snow, and other types of inclement weather. Moreover, because this user-recognition device 404 is configured to specifically target a location of a palm of the user 406, this user-recognition device 404 provides for targeting palms of users disposed at a wide variety of heights relative to the user-recognition device 404. For example, and as illustrated, because this user-recognition device 404 is configured to specifically target a location of a palm of the user 406, this user-recognition device 404 provides for a customer to safely park within reach of the user-recognition device 404 with a wide variety of car heights. For example, FIG. 4A illustrates the user 406 safely parked in a compact car 412 with a palm within reach of the user-recognition device 404 at a relatively low height 414. While FIG. 4B illustrates the user 406 safely parked in an elevated car 416 with a palm within reach of the user-recognition device 404 at a relatively high height 418, higher than the palm at the low height 414. In both examples, where the user 406 is safely parked within reach of the user-recognition device 404, the user-recognition device 404 is configured to have a relatively long working distance 420 (e.g., a working distance from at least about 250 mm to at most about 1000 mm) providing for specifically targeting a location of the palm at any location within the long working distance 420. For example, the user-recognition device 404 is configured to specifically target a location of the palm at relatively low heights (e.g. low height 414) where the palm may be at a location farther away from the device and configured to specifically target a location of a palm at relatively high heights (e.g., high height 418) where the palm may be at a location closer to the device than the palm being at the location farther away from the device. While FIGS. 4A-B illustrate the user-recognition device 404 comprising components generally aimed downwards, the components may be aimed in any direction. For example, the user-recognition device 404 may be aimed generally forward, upward, outward, inward, sideways, etc. depending on position and orientation of the user-recognition device 404 and the environment where the user-recognition device 404 is implemented.

Figure 5A:
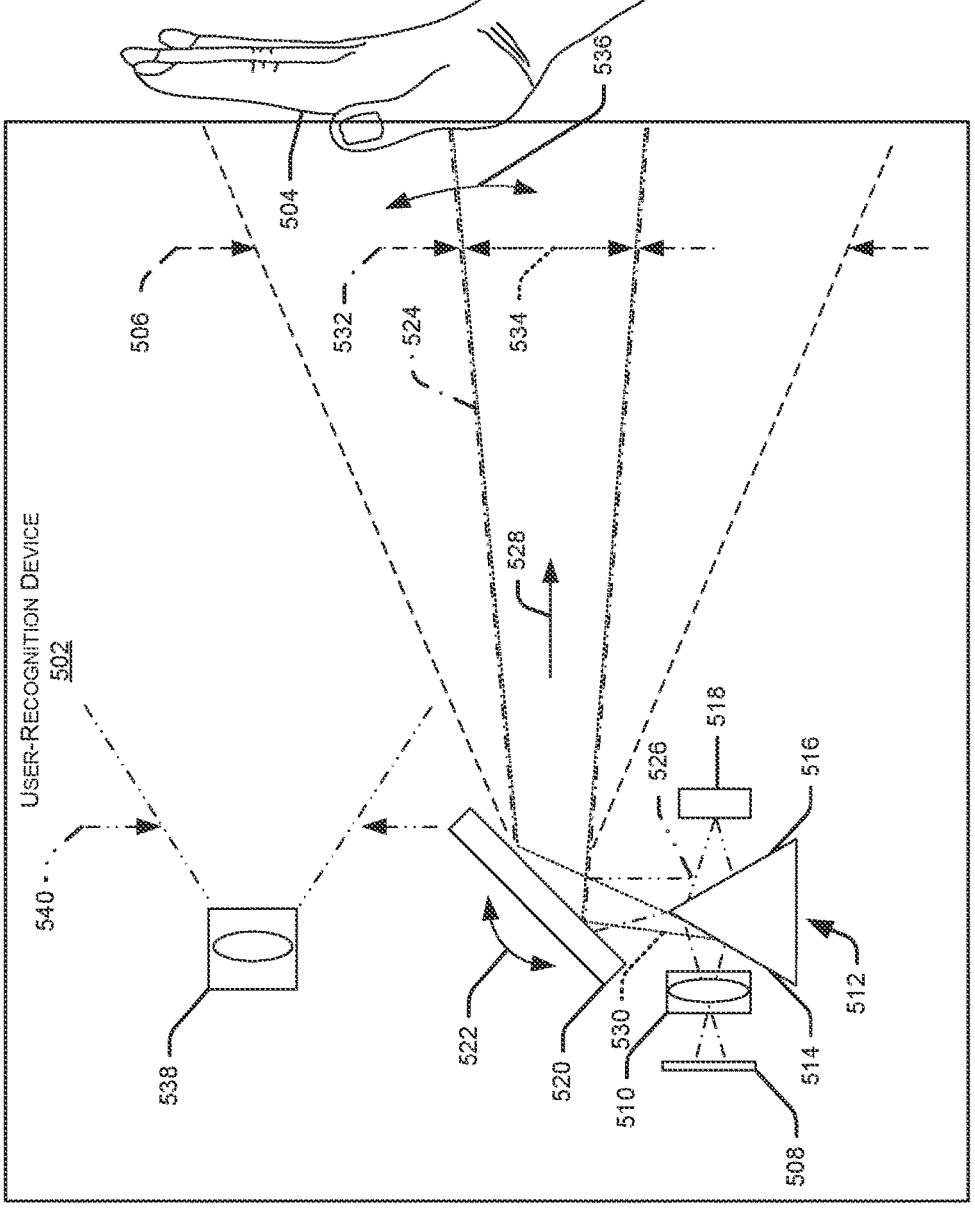
FIGS. 5A-B collectively illustrate a schematic view of an embodiment of a user-recognition device configured to generate image data of a palm of a user for purposes of identifying the user.
Figure 5A:
Figure 5B:
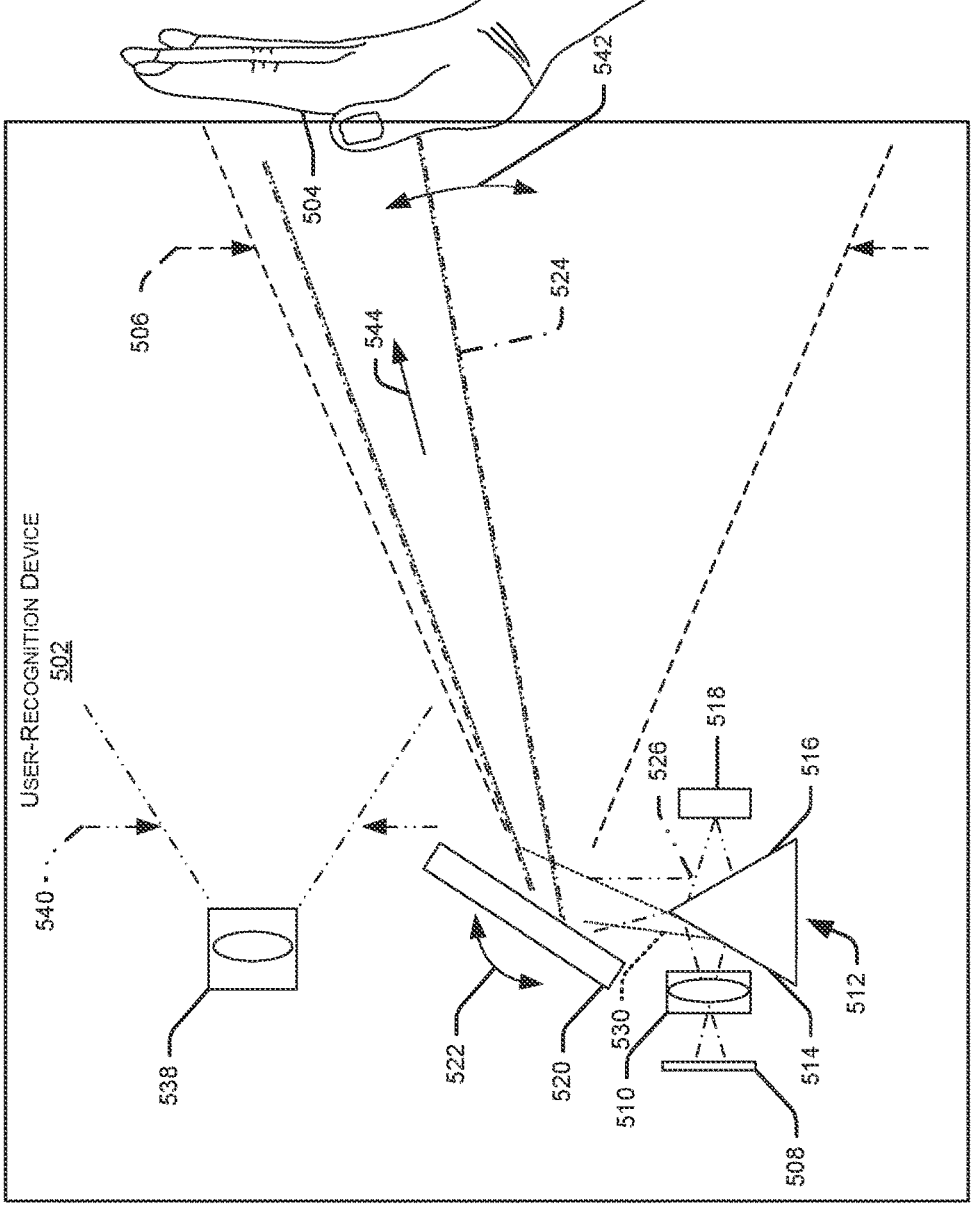
Figure 5B:

FIGS. 5A-B collectively illustrate a schematic view 500 of an embodiment of a user-recognition device 502 configured to generate image data of a palm 504 of a user for purposes of identifying the user. The user-recognition device 502 may be the same as the user-recognition device 404 configured with scanning implementations that allow the user-recognition device 502 to specifically target a location of a palm 504 of a user without the need to illuminate and/or capture an entire scan FOV 506 at all times. For example, previous architecture of user-recognition devices utilized infrared palm biometrics for user identification that capture a wide FOV at a short working distance (e.g., working distances of about 110 mm). Which works well, for example, in store applications, where a user has easy access to be physically adjacent to the payment/identification location. As discussed above, in quick service restaurant applications, for example, it becomes much more difficult for a user to be physically adjacent to the payment/identification location. Where, for example, it is not an easy/reasonable expectation for a customer to safely park within reach of previous user-recognition devices, calling for an increase in the working distance of the previous user-recognition devices. However, scaling the previous user-recognition devices to longer working distances (e.g., working distances of from at least about 250 mm to at most about 1000 mm) and maintaining wide angular FOV directly is not a viable solution, as continually covering such a large volume FOV would require an increase in optical power, sensor resolution and overall costs. For example, when expanding from about a 110 mm working distance to about a 750 mm working distance, optical power increases from about 6.3 W to over about 80 W and the user-recognition device moves from class I to a class IV laser product (extremely dangerous). Additionally, to cover the full FOV at higher working distances while maintaining sufficient pixels per square inch (PPI), the user-recognition device would require a sensor resolution of approximately 66 MP. On top of a 10× increase in cost for required vertical-cavity surface-emitting lasers (VCSELs) and a 3× increase in cost for higher sensor resolution, there would also result in higher operation optical power consumption costs and increased costs for larger optics to accommodate an expanded FOV. Thus, to avoid the costs of linear scaling FOV, the user-recognition device 502 provides scanning implementations that allow the user-recognition device 502 to specifically target the location of a palm 504 of a user without the need to illuminate and/or capture the entire scan FOV 506 at all times.

FIGS. 5A-B illustrate the user-recognition device 502 comprising a first sensor 508 for capturing an image of the palm 504 of a user. The first sensor 508 may comprise a camera, a near infrared (NIR) camera, or an 8-megapixel camera. A lens 510 may be disposed with the first sensor 508. The lens 510 may comprises an autofocus lens or a liquid autofocusing lens. The lens 510 may provide for in-focus images over the long working distance 420. The lens 510 may be associated with an autofocus component. For example, the lens 510 and/or other elements within the lens 510 may be disposed with a displaceable assembly configured to displace the lens 510 and/or the other elements within the lens 510 to focus the lens 510. The lens 510 is configured such that the focal length is correct for the imaging distance and focus. A first mirror 512 may be disposed with the first sensor 508 and/or adjacent to the lens 510. The first mirror 512 may comprise a pickoff mirror having a triangular or pyramidal shape and comprising a first reflective surface 514 and a second reflective surface 516, where the first reflective surface 514 is disposed adjacent to the lens 510. While FIG. 5 illustrates the first mirror 512 comprising a pickoff mirror, the first mirror 512 may comprise a polarizing beam splitter (PBS) or a knife edge mirror.

A projector 518 may be disposed with the first mirror 512. For example, the projector 518 may be disposed adjacent to the second reflective surface 516 of the first mirror 512. The projector 518 may comprise a near infrared (NIR) projector or a vertical-cavity surface-emitting laser (VCSEL). The projector 518 and the first sensor 508 may be facing each other with the first mirror 512 disposed in-between the projector 518 and the first sensor 508.

A second mirror 520 may be disposed with the first mirror 512. For example, the second mirror 520 may be disposed at a default angle of about 45 degrees above the first mirror 512. The second mirror 520 may be displaceable 522. For example, the second mirror 520 may be tiltable by about +/−25 degrees. The steering component 410 may steer the second mirror 520 based at least in part on a location of the palm 504 of the user. The second mirror 520 may comprise a scan mirror, a voice-coil mirror, or a galvo mirror pair. The second mirror 520 may include an actuator for displacing and/or controlling the displacement of the second mirror 520. For example, the second mirror 520 may be associated with an electric actuator, an electromechanical actuator, electrohydraulic actuator, linear motor actuator, rotary motor actuator, magnetic actuator, pneumatic actuator, hydraulic actuator, etc. The second mirror 520 may be configured to reflect infrared light 524, projected from the projector 518 and reflected 526 from the first mirror 512, in a direction 528 toward the palm 504 of the user. Moreover, the second mirror 520 may be further configured to reflect received infrared light 530, reflected from the palm 504 of the user to the first mirror 512 and to the first sensor 508. The reflected infrared light 524 projected from the projector 518 and reflected 526 from the first mirror 512 may define an illumination beam 532. The reflected received infrared light 530, reflected from the palm 504 of the user to the first mirror 512 and to the first sensor 508 may define a sensor FOV 534. Where, after the first mirror 512, the illumination beam 532 and the sensor FOV 534 are substantially coaxial.

For example, the first mirror 512 may reflect projected infrared light and/or detected infrared light, such that the projected infrared light and the detected infrared light are directed to be substantially coaxial when the projected infrared light and the detected infrared light are reflected by the second mirror 520. The sensor FOV 534 may have a FOV of about 30 degrees. The scan FOV 506 may have a FOV of about 130 degrees. With the illumination beam 532 and the sensor FOV 534 being substantially coaxial, this provides for the second mirror 520 to steer 536 the illumination beam 532 and the sensor FOV 534 onto the palm 504 where an image may be captured. For example, the second mirror 520 may steer 536 the illumination beam 532 and the sensor FOV 534 colinearly onto the palm 504 within the scan FOV 506 where an image may be captured. The first mirror 512 and/or the second mirror 520 in the path of the first sensor 508 may comprise image quality surfaces to provide for preventing distorted image data in addition to NIR reflecting wavefront error low enough to prevent negative impacts on the image quality at the first sensor 508.

The user-recognition device 502 may further comprise a second sensor 538. The second sensor 538 may have a FOV 540 directed with the scan FOV 506. The FOV 540 may have a FOV of about 150 degrees. The second sensor 538 may detect a presence of the palm 504. For example, the second sensor 538 may detect a presence of the palm 504 proximate to and/or within the scan FOV 506. The second sensor 538 may comprise a camera, a multi-region distance sensor, a visible light RGB camera, a near infrared range (NIR) camera, etc. The second sensor 538 may be used to capture one or more frames containing the palm 504. A feed of the second sensor 538 of the captured frames containing the palm 504 may be passed through a machine learning API. For example, the feed of the second sensor 538 may be passed through an open source machine learning API (e.g., MediaPipe Hands). The API may detect the palm 504, after which coordinates (e.g., X, Y coordinates) of the palm 504 may be extracted. These coordinates are converted to mirror rotation coordinates (e.g., Ox, Oy) using a calibrated transfer function, at which point these mirror rotation coordinates are passed to the second mirror 520. The second mirror 520 rotates accordingly and steers 536 the illumination beam 532 and the sensor FOV 534 substantially colinearly onto the palm 504 where an image is captured.

The user-recognition device 502 may continuously search for a start signal to start capturing image data of the palm 504 of the user. Where subsequent to receiving a start signal, the user-recognition device 502 may continuously track the palm 504 and update a position of the second mirror 520 to capture image data of the palm 504 until the user-recognition device 502 receives a signal from the palm-identification component 148 and/or the palm-verification component 150, for example, that the palm 504 of the user has been identified. In one example, the presence-detection component 130 of the user-recognition device may continuously look for a start signal from the second sensor 538 and/or another device (e.g., a distance sensor, a time-of-flight sensor). Where subsequent to receiving the start signal, the steering component 410 may continuously update a position of the second mirror 520 to a position where the palm 504 is located, in a continuous a loop, to capture image data of the palm until the user-recognition device receives a signal from the palm-identification component 148 and/or the palm-verification component 150 that the palm 504 of the user has been identified.

FIG. 5B illustrates the steering component 410 having steered 542 the second mirror 520 based at least in part on a location of the palm 504 of the user. For example, the steering component 410 may have received data associated with a location of the palm 504 of the user, and steered 542 the second mirror 520 based at least in part on the location data of the palm 504 of the user. For example, the steering component 410 may receive the location data of the palm 504, via the second sensor 538, where the second sensor 538 feeds captured image data of the palm 504 to an open source machine learning API. The API extracts location coordinates (e.g., X, Y coordinates) of the palm 504, converts these coordinates into mirror rotation coordinates (e.g., Ox, Oy) using a calibrated transfer function, and sends these mirror rotation coordinates to the second mirror 520. Based at least in part on these mirror rotation coordinates, the second mirror 520 displaces (e.g., tilts) to reflect infrared light 524, projected from the projector 518 and reflected 526 from the first mirror 512, in a direction 544 toward the palm 504 of the user.

Figure 6A:
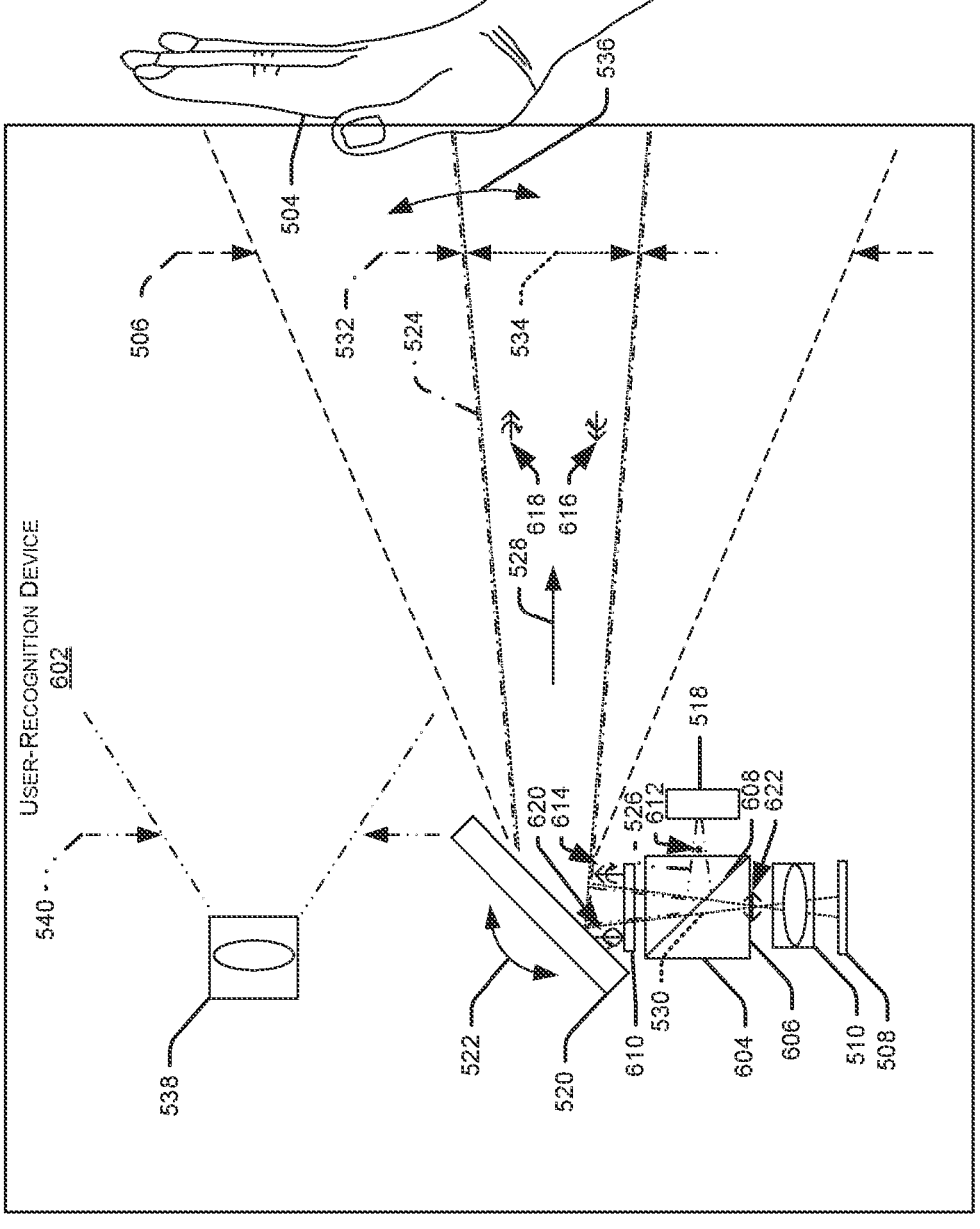
FIGS. 6A-B collectively illustrate a schematic view of another embodiment of a user-recognition device configured to generate image data of a palm of a user for purposes of identifying the user.
Figure 6B:

FIGS. 6A-B collectively illustrate a schematic view 600 of another embodiment of a user-recognition device 602 configured to generate image data of a palm 504 of a user for purposes of identifying the user. The user-recognition device 602 may be the same as the user-recognition device 404 or 502 configured with scanning implementations that allow the user-recognition device 602 to specifically target a location of a palm 504 of a user without the need to illuminate and/or capture an entire scan FOV 506 at all times. Inasmuch as FIG. 6 depicts the user-recognition device 602, while referring to the same elements and features of the user-recognition device 502, the following discussion of specific features may refer interchangeably to any of FIGS. 1-5 except where explicitly indicated. In particular, FIG. 6 illustrates an embodiment of the user-recognition device 602, including the first sensor 508, lens 510, projector 518, second mirror 520, and the second sensor 538. Here, in this embodiment, the user-recognition device 602 may include a first mirror 604 disposed above the first sensor 508 and/or adjacent to the lens 510. The first mirror 604 may comprise a polarizing beam splitter (PBS) having a first surface 606 and a second surface 608, where the first surface 606 is disposed adjacent to the lens 510 and the second surface 608 is disposed adjacent to the projector 518. While FIG. 6 illustrates the first mirror 604 comprising a PBS, the first mirror may comprise a knife edge mirror.

Similar to the user-recognition device 502, the second mirror 520 may be configured to reflect infrared light 524, projected from the projector 518 and reflected 526 from the first mirror 604, in the direction 528 toward the palm 504 of the user, and reflect received infrared light 530, reflected from the palm 504 of the user to the first mirror 604 and to the first sensor 508. A waveplate 610 may be disposed between the first mirror 604 and the second mirror 520. For example, where the first mirror 604 comprises a polarizing beam splitter (PBS), the waveplate 610 may be disposed between the first and second mirrors 604 and 520. The waveplate 610 may include a quarter wave plate and provide for turning infrared light projected from the projector 518 into a circular polarization, and subsequent to the circular polarized infrared light reflecting off of the palm 504, the waveplate 610 may provide for turning the reflected infrared light into orthogonal linear polarized light reflected to the first sensor 508. For example, the s-polarized infrared light projected from the projector 518 may be orientated substantially parallel 612 (represented by a dot in FIG. 6) to the surface. The infrared light reflected from the second surface 608 and passing through the waveplate 610 may then be re-orientated to be substantially in a right hand circular (RHC) orientation 614 (represented by right pointing arrow crossing an upward facing arrow in FIG. 6). The second mirror 520 may then reflect the infrared light to be substantially in a left hand circular (LHC) orientation 616 the palm 504 may then re-orientate the infrared light to be substantially in a left hand circular (LHC) orientation 616. The palm 504 may then reflect the infrared light to be substantially in a right hand circular (RHC) orientation 618. The second mirror 520 may then reflect the infrared light to be substantially in a left hand circular (LHC) orientation 620. The waveplate 610 may re-orientate the infrared light reflected by the second mirror 520 from the LHC orientation 620 to have p-polarization to be substantially perpendicular 622 (represented by the horizontal double headed arow in FIG. 6). Where, the first mirror 604 (e.g., polarizing beam splitter (PBS)) transmits the p-polarized infrared light to the first sensor 508.

Similar to FIG. 5B, FIG. 6B illustrates the steering component 410 having steered 624 the second mirror 520 based at least in part on a location of the palm 504 of the user. Similar to FIG. 5B, FIG. 6B illustrates the steering component 410 may receive location data of the palm 504, via the second sensor 538, where the second sensor 538 feeds the captured image data of the palm 504 to an open source machine learning API, and the API sends mirror rotation coordinates (e.g., Ox, Oy) to the second mirror 520. Here, in FIG. 6B the second mirror 520 displaces (e.g., tilts) to reflect infrared light 524, projected from the projector 518 and reflected 526 from the first mirror 604, in a direction 626 toward the palm 504 of the user.

Figure 7:
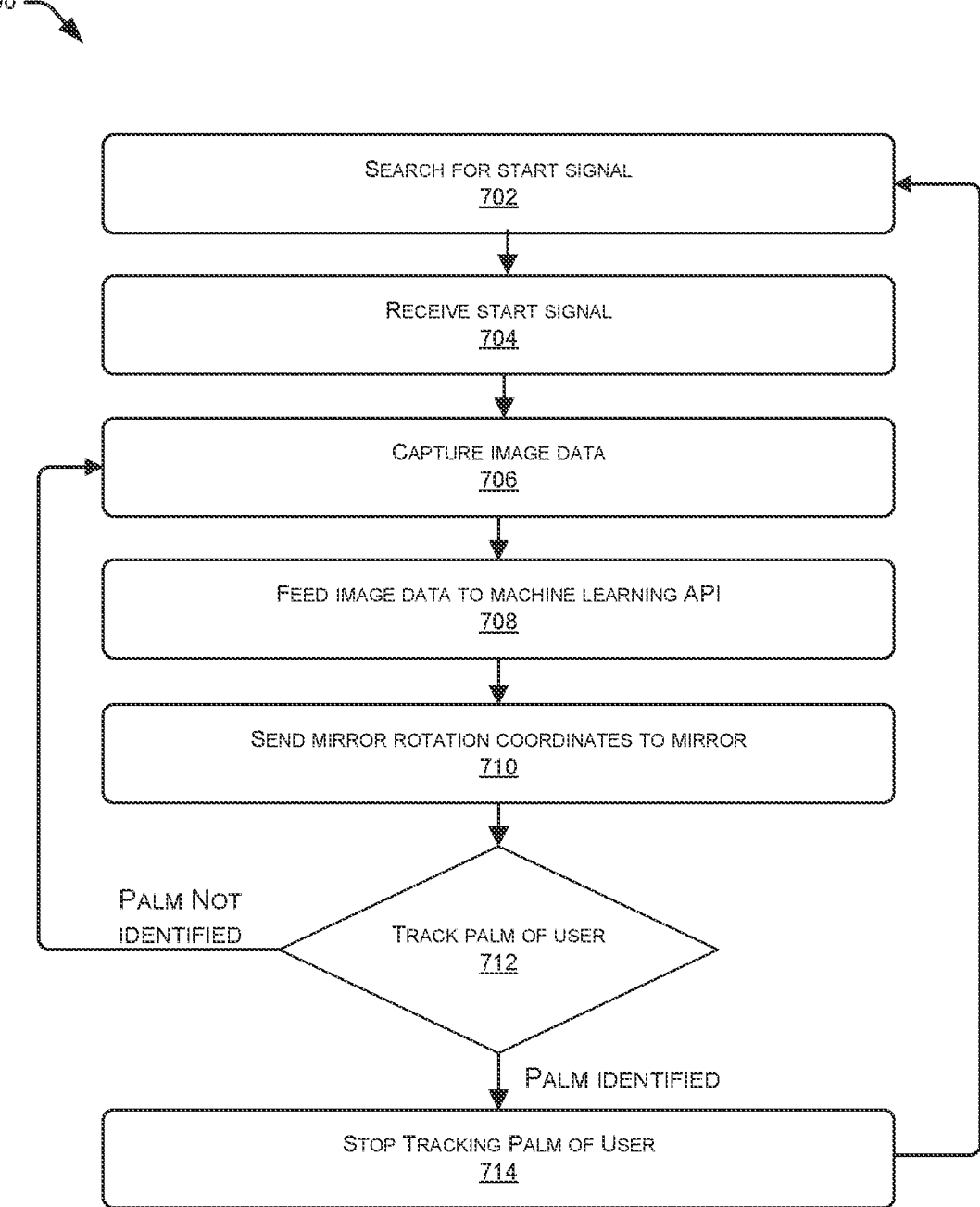
FIG. 7 illustrates a flow diagram of an example process that the user-recognition system may implement.

FIG. 7 illustrates a flow diagram of an example process 700 that the user-recognition system may implement. The process 700, as well as the additional processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures may be eliminated, combined, or performed in an alternate order. Any steps or operations may be performed serially or in parallel. Furthermore, the order in which the operations are described is not intended to be construed as a limitation. In some instances, the processes described herein may be performed, in whole or in part, by the servers 108, the user-recognition devices 104, 404, 502, 602, and/or a combination thereof.

An operation 702 represents a user-recognition device (e.g., user-recognition device 104, 404, 502, or 602) continuously searching for a start signal to start capturing image data of a palm of a user. In one example, operation 702 may represent a presence-detection component (e.g., presence-detection component 130) of the user-recognition device continuously looking for a start signal from a sensor (e.g., second sensor 538 and/or another device (e.g., a distance sensor, a time-of-flight sensor, a visible camera, etc.)). In another example, operation 702 may represent a beam break and/or a user entering a location (e.g., a checkout location, a check-in location, a drive through location, etc.). In another example, operation 702 may represent the steering component of the user-recognition system continuously looking for a start signal from the sensor. The start signal may comprise an indication that the sensor and/or other device has detected a presence of the palm proximate to and/or within a scan FOV (e.g., scan FOV 506). The sensor and/or the other device may send the indication to the presence-detection component and/or the steering compo- nent, representing a signal to start capturing image data of the palm of the user.

An operation 704 represents the user-recognition device receiving the indication that that the sensor has detected the palm of the user within the scan FOV. For example, opera- tion 704 may represent the user-recognition device receiving the start signal.

An operation 706 represents the user-recognition device capturing image data of the palm of the user. For example, operation 706 may represent the sensor (e.g., second sensor 538) capturing an image of the palm of the user. For example, the sensor may be a visible camera for palm coordinate tracking. The sensor may be used to capture one or more frames containing data representing an image of the palm of the user within the scan FOV.

An operation 708 represents the user-recognition device feeding the one or more frames containing the data repre- senting the image of the palm of the user to a machine learning API. For example, the sensor (e.g., second sensor 538) of the user-recognition device may feed captured image data of the palm to an open source machine learning API (e.g., MediaPipe Hands), where the feed of captured image data of the palm is passed through the open source machine learning API. The API may then detect the palm, after which coordinates (e.g., X, Y coordinates) of the palm may be extracted. These coordinates are converted to mirror rotation coordinates (e.g., Ox, Oy) using a calibrated transfer func- tion.

An operation 710 represents the user-recognition device sending the mirror rotation coordinates to a mirror (e.g., second mirror 520). The mirror rotates accordingly and steers an illumination beam (e.g., illumination beam 532) and a sensor FOV (e.g., sensor FOV 534) onto the palm where an image is captured.

An operation 712 represents the user-recognition device continuously tracking the palm of the user and updating a position of a mirror (e.g., second mirror 520) to capture image data of the palm of the user. For example, operation 712 may represent the steering component of the user- recognition device continuously updating a position of the mirror to a position where the palm is located, in a continu- ous loop, so that a sensor (e.g., first sensor 508) can capture image data of the palm of the user until the steering component receives a signal from a palm-identification component (e.g., palm-identification component 148 or 150) that the palm of the user has been identified. For example, operation 712 may represent the steering component con- tinuously updating a position of the mirror to a position where the palm is located to provide for the sensor to capture image data of the palm of the user for user identification and/or user registration.

An operation 714 concludes the illustration of the process 700 and represents the user-recognition device stopping the tracking of the palm of the user. Subsequent to operation 714, the user-recognition device may proceed back to opera- tion 702 to again continuously search for a start signal to start capturing image data of a palm of a user.

Embodiments may be provided as a software program or computer program product including a non-transitory com- puter-readable storage medium having stored thereon instructions (in compressed or uncompressed form) that may be used to program a computer (or other electronic device)

to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), ran- dom access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine- readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmis- sion of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be uti- lized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A device comprising:

a near infrared (NIR) camera for capturing an image of a palm of a user;

a lens;

a pickoff mirror having a triangular shape and comprising a first reflective surface on a first side of the triangular shape and a second reflective surface on a second side of the triangular shape, wherein the first side and the second side share a common edge, and further wherein the first reflective surface is disposed adjacent to the lens;

a near infrared (NIR) projector disposed adjacent to the second reflective surface of the pickoff mirror, wherein the NIR camera and the NIR projector are disposed on opposite sides of the pickoff mirror;

an actuator;

a mirror coupled to the actuator, wherein the mirror is rotated responsive to the actuator and is configured to:

reflect infrared light, projected from the NIR projector, using the second reflective surface, in a direction toward the palm, and reflect received infrared light to the NIR camera using the first reflective surface;

a visible light red-green-blue (RGB) camera configured to detect a presence of the palm of the user within a field of view (FOV) of the NIR camera as reflected by the mirror;

one or more processors; and one or more computer-readable media storing computer-executable instructions that, when executed, cause the one or more processors to perform acts comprising:

determining that a corresponding image acquired by the RGB camera depicts the palm within the FOV;

causing the NIR projector to project infrared light;

causing the actuator to rotate the mirror to direct the infrared light toward the palm within the FOV; and causing the NIR camera to generate image data, the image data representing the image of the palm within the FOV.

2. The device as recited in claim 1, wherein the causing the actuator to rotate the mirror is based at least in part on the determining that the corresponding image acquired b the RGB camera depicts the palm within the FOV.

3. The device as recited in claim 1, wherein the determining that the corresponding image acquired by the RGB camera depicts the palm within the FOV is based on capturing, via the RGB camera, a frame containing data representing the corresponding image of the palm; and the one or more computer-readable media further storing computer-executable instructions that, when executed, cause the one or more processors to perform acts comprising:

causing a machine learning application programming interface (API) to extract coordinates of the palm contained in the frame; and based at least in part on the coordinates of the palm contained in the frame, causing the actuator to rotate the mirror to:

reflect the infrared light, reflected from the second reflective surface of the pickoff mirror, in the direction toward the palm, and reflect the received infrared light, reflected from the palm, to the first reflective surface of the pickoff mirror and to the NIR camera.

4. A device comprising:

a first mirror comprising a first reflective surface on a first side and a second reflective surface on a second side, wherein the first side and the second side share a common edge;

a first sensor having a field of view (FOV), wherein the first sensor is disposed adjacent to the first reflective surface of the first mirror and the FOV is directed toward the first reflective surface;

a projector disposed adjacent to the second reflective surface of the first mirror, wherein infrared light emitted from the projector is directed toward the second reflective surface and further wherein the projector and the first sensor are disposed on opposite sides of the first mirror;

a second mirror disposed adjacent to the common edge, wherein the second mirror:

rotates with regard to a single axis, reflects infrared light from the projector that is reflected from the second reflective surface of the first mirror in a first direction, and reflects received light to the first sensor using the first reflective surface;

an actuator coupled to the second mirror, wherein the actuator during operation rotates the second mirror with regard to the single axis;

a second sensor configured to detect a presence of a palm of a user within the FOV of the first sensor as reflected by the second mirror;

one or more processors; and one or more computer-readable media storing computer-executable instructions that, when executed, cause the one or more processors to:

determine that sensor data acquired by the second sensor depicts the palm of the user within the FOV;

cause the projector to project the infrared light;

operate the actuator to rotate the second mirror to direct the infrared light toward the palm within the FOV; and cause the first sensor to generate image data, the image data representing the palm within the FOV.

5. The device as recited in claim 4, the one or more computer-readable media further storing computer-executable instructions that, when executed, cause the one or more processors to:

acquire the sensor data using the second sensor; and determine, based on the sensor data, that the palm of the user is present within the FOV.

6. The device as recited in claim 5, wherein the second sensor comprises a camera.

7. The device as recited in claim 4, wherein the projector comprises a near infrared (NIR) projector or a vertical-cavity surface-emitting laser (VCSEL).

8. The device as recited in claim 4, wherein the first sensor comprises a near infrared (NIR) camera or an 8-megapixel red-green-blue (RGB) camera.

9. The device as recited in claim 4, wherein the second mirror comprises a scan mirror, a voice-coil mirror, or a galvo mirror pair.

10. The device as recited in claim 4, further comprising a lens disposed between the first sensor and the first reflective surface.

11. The device as recited in claim 10, wherein the lens comprises an autofocus lens or a liquid autofocusing lens.

12. The device as recited in claim 4, further comprising a waveplate disposed between the first mirror and the second mirror.

13. The device as recited in claim 12, wherein the first mirror comprises a polarizing beam splitter (PBS).

14. The device as recited in claim 4, the one or more computer-readable media storing computer-executable instructions that, when executed, cause the one or more processors to:

acquire second sensor data using the first sensor;

determine, based on the second sensor data, location data indicative of the palm of the user; and operate the actuator based on the location data.

15. The device as recited in claim 4, wherein a working distance associated with acquisition of image data using the first sensor is between 250 mm and 1000 mm.

16. A device comprising:

a first mirror comprising a first reflective surface and a second reflective surface;

a first sensor comprising an image sensor;

a lens that is between the first reflective surface and the first sensor;

a projector that, during operation, directs infrared light toward the second reflective surface, wherein the projector and the first sensor are disposed on opposite sides of the first mirror;

an actuator;

a second mirror coupled to the actuator, wherein the second mirror is rotatable, and further wherein the second mirror is disposed adjacent to the first mirror such that:

infrared light reflected from the second reflected surface is reflected by the second mirror, and received light is reflected from the second mirror to the first reflective surface;

a second sensor for detecting a presence of a palm within a field of view (FOV) of the first sensor as reflected by the second mirror;

one or more processors; and one or more computer-readable media storing computer-executable instructions that, when executed, cause the one or more processors to perform acts comprising:

receiving an indication that the second sensor has detected the palm of a user within the FOV;

causing the projector to project infrared light;

causing the actuator to rotate the second mirror to direct the infrared light toward the palm within the FOV; and causing the first sensor to generate image data, the image data representing the palm within the FOV.

17. The device as recited in claim 16, wherein the one or more computer-readable media further storing computer-executable instructions that, when executed, cause the one or more processors to perform acts comprising:

sending the image data to a remote computing device for attempting to identify a user account.

18. The device as recited in claim 16, wherein the one or more computer-readable media further storing computer-executable instructions that, when executed, cause the one or more processors to perform acts comprising:

generating feature data using the image data;

analyzing the feature data with respect to stored feature data associated with a respective user account; and identifying a user account.

19. The device as recited in claim 16, wherein the receiving the indication that the second sensor has detected the palm within the FOV comprises capturing, via the second sensor, a frame containing the palm; and the one or more computer-readable media further storing computer-executable instructions that, when executed, cause the one or more processors to perform acts comprising:

determining coordinates of the palm contained in the frame; and based at least in part on the coordinates of the palm contained in the frame, causing the rotation of the second mirror to:

reflect the infrared light in a direction toward the coordinates of the palm, and reflect the received light to the first reflective surface.

20. The device as recited in claim 16, wherein the first mirror comprises a polarizing beam splitter (PBS) and further comprising:

a waveplate disposed between the first mirror and the second mirror.

* * * * *